United States Patent [19]
Shapiro

[11] Patent Number: 5,205,069
[45] Date of Patent: Apr. 27, 1993

[54] HIGH SPEED DOOR ASSEMBLY

[75] Inventor: Carolyn Shapiro, Idaho Falls, Id.

[73] Assignee: The United States of America as represented by the United States Department of Energy, Washington, D.C.

[21] Appl. No.: 769,657

[22] Filed: Oct. 2, 1991

[51] Int. Cl.⁵ .................. E05F 15/20; E05B 65/10
[52] U.S. Cl. ................................ 49/31; 49/141; 49/360
[58] Field of Search ............ 49/31, 137, 141, 360

[56] References Cited
U.S. PATENT DOCUMENTS

| | | | |
|---|---|---|---|
| 3,064,963 | 11/1962 | Wilson | 49/360 X |
| 3,214,156 | 10/1965 | Klose et al. | 49/31 |
| 4,003,714 | 1/1977 | Foglino et al. | 49/360 X |

Primary Examiner—Philip C. Kannan
Attorney, Agent, or Firm—Tyrone Davis; Thomas G. Anderson; William R. Moser

[57] ABSTRACT

A high speed door assembly, comprising an actuator cylinder and piston rods, a pressure supply cylinder and fittings, an electrically detonated explosive bolt, a honeycomb structured door, a honeycomb structured decelerator, and a structural steel frame encasing the assembly to close over a 3 foot diameter opening within 50 milliseconds of actuation, to contain hazardous materials and vapors within a test fixture.

20 Claims, 5 Drawing Sheets

HIGH SPEED DOOR ASSEMBLY

CONTRACTUAL ORIGIN OF THE INVENTION

The United States Government has rights in this invention pursuant to Contract No. DE-AC07-76ID01570 between the United States Department of Energy and EG&G IDAHO, INC.

BACKGROUND OF THE INVENTION

The high speed door assembly is designed to close over a 3 foot diameter opening within 50 milliseconds of actuation, to contain hazardous materials and vapors within a test fixture. Improvement in the high speed door assembly over prior patented devices is to drastically reduce the mass of the moving parts required. By doing this much lower cylinder pressures are acceptable, and a single explosive bolt can accomplish the required actuation. This also simplifies the sealing requirements and the piston, and the mass and complexity of the supporting structure of the door. The total weight of the moving parts is estimated at 145 pounds. The required gas pressure for acceleration of these parts to attain the required closure time is 800 psi, with nitrogen as the gas medium. This is a 600% lower working pressure than similar devices with heavy steel door elements.

SUMMARY OF THE INVENTION

The door assembly is accelerated by a high pressure cylinder and piston arrangement, with the door element as an extension to the piston rod. Movement is actuated by an explosive bolt. The bolt is threaded into the end of the piston rod. When a current is supplied to the bolt, it detonates and divides into two pieces, allowing the lower half to move with the released piston under pressure. The cylinder is pre-pressurized so that after actuation, rapid acceleration occurs instantaneously. Deceleration occurs with the use of an aluminum honeycomb energy absorber. The door element impacts the honeycomb at the end of its 3 foot stroke, and the honeycomb is then crushed three to four inches in length, which slows and stops the door in a predictable profile. Reduction of weight, without reduction of strength and buckling resistance was accomplished using a reusable or replaceable aluminum honeycomb composite panel for the door element. This panel was built from an aluminum honeycomb core sandwiched between two solid aluminum facings. The piston rod assembly was also lightened by using thick-walled aluminum tubing, rather than conventional solid rods.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

To achieve the foregoing and other objects and in accordance with the purpose of the present invention, as embodied and broadly described herein, the invention may comprise an actuator cylinder and piston rods, a pressure supply cylinder and fittings, an electrically detonated explosive bolt, a honeycomb structured door, a honeycomb structured decelerator, and a structural steel frame encasing the assembly.

Therefore it is a object of this invention to provide a high speed door assembly to contain hazardous materials and vapors within a test fixture.

BRIEF DESCRIPTION OF THE DRAWINGS

The accompanying drawings, which are incorporated in and form part of the specification, illustrate an embodiment of the present invention and together with the description, serve to explain the principles of the invention. In the drawings.

DETAILED DESCRIPTION OF THE INVENTION

Figure 1:
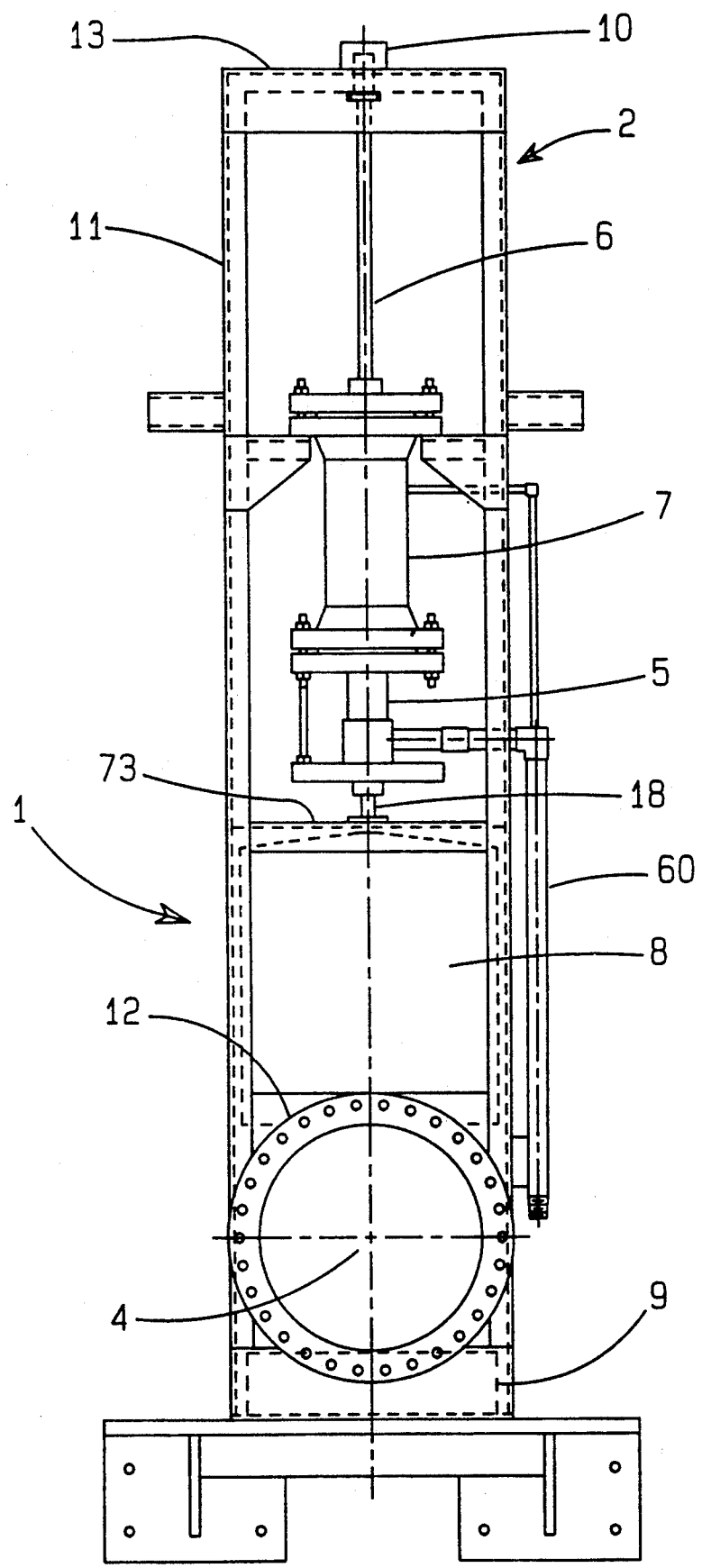
FIG. 1 shows a front view of an embodiment of the door assembly.
Figure 2:
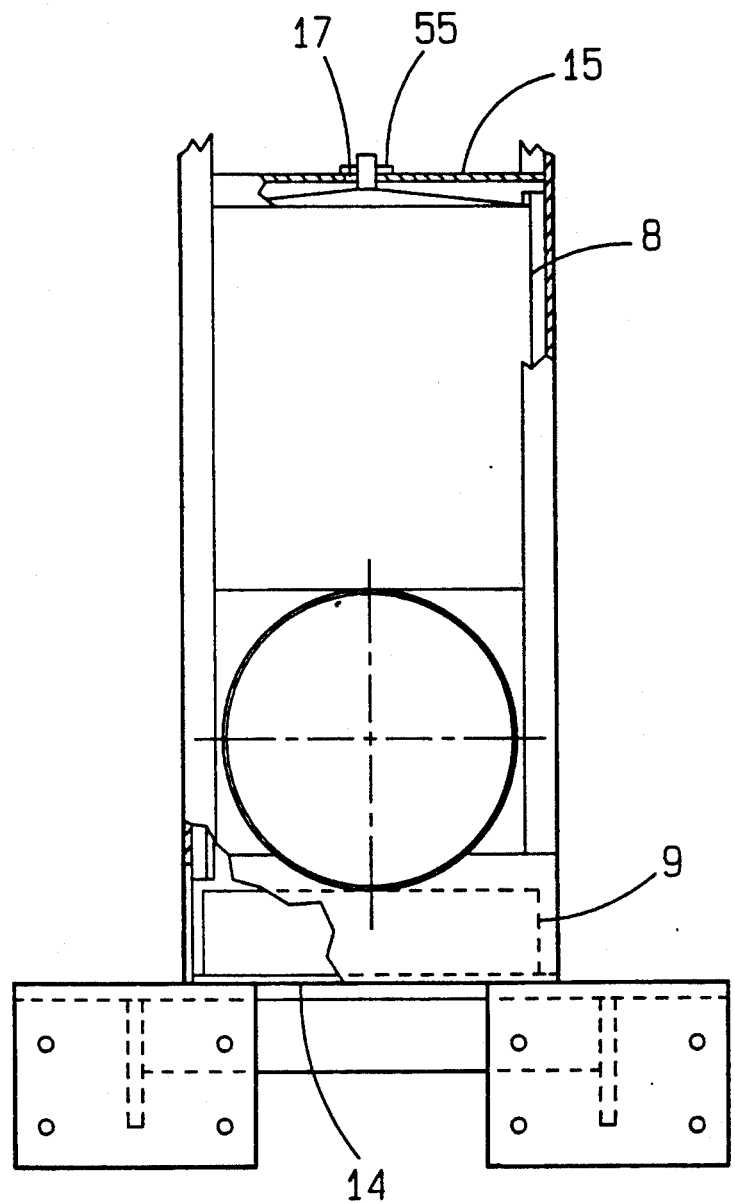
FIG. 2 shows a cut-away of the door as shown in FIG. 1.

Referring to FIGS. 1 and 2, the high speed door 1 consists of several assemblies supported by a structural steel frame 2 which mounts to the end of a flight tunnel 4. Included in the assemblies are an actuator cylinder 5 and piston rods 6, a pressure supply cylinder 7 and fittings, a honeycomb sandwich door element 8, a honeycomb decelerator 9, and an explosive bolt 10 which is electrically detonated to begin actuation of the high speed door 1.

The high speed door assemblies are supported by the steel frame 2 which mates with the shot hole flange 12. The ventilation plenum bolts to the frame 2. The frame 2 has several roles in addition to that of a structural support. It positions and supports the honeycomb decelerator 9 while providing a path for its disposal, and guides the honeycomb sandwich door along the length of its stroke, as well as, provide a means for removal and replacement of the door element 8, and supports the explosive bolt 10 and its related hardware.

The primary structural element of the frame is a 15×50 standard channel 11. These channels run almost the full length of the sides of the frame, welding to a piece of the same size channel which forms the top surface of the frame 13, and to side plates at the bottom of the frame 14. Another length of 15×50 channel 15 traverses the width between side channels 11 and is welded to them at a height just above the top surface of the door 8 in the fully open position. This creates a top boundary for the ventilation plenum and includes an orifice 17 through which the piston rod 18 may travel.

Figure 3:
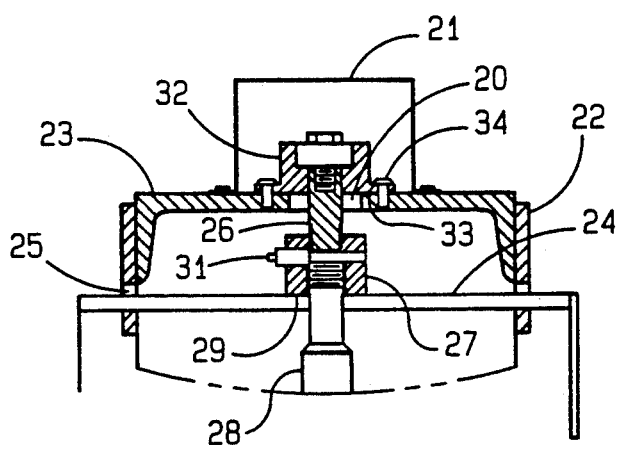
FIG. 3 shows a cross sectional view of the explosive bolt assembly as shown in FIG. 1.

FIG. 3 shows the top of the frame 23 is reinforced with ½ inch thick plate 22 on the front and back, and contains an orifice 20 centered on the top channel 23. A cover plate 21, screws into the top channel 23 over the explosive bolt 26. A mechanical lock 24, slides through a slot 25 cut into the top plates 22, and directly underneath the explosive bolt 26. The lock 24 is installed to keep the door 8 in the fully open position during non-test periods, and when in place is a visual indicator that the door cannot be closed and therefore poses no safety hazard for personnel working in the shot hole area.

An adaptor 27, threads into the top piston rod assembly 28 inner diameter and forms a shoulder 29 in which the mechanical lock 30 will slide under. An expendable link pin 31 is pinned to the adaptor 27 at the bottom and threads into the explosive bolt 26 at the top. The explosive bolt slips into an expendable steel ring 32. The ring 32 confines the explosive bolt 26 during detonation in such a way that the head of the bolt 26 is cleanly sheared from the threaded bottom section of the bolt 26 parallel to the lower surface of the ring 32 in a predictable manner, minimizing shrapnel damage during the explosion. The ring 32 rests on the shoulder 33 of the explosive bolt housing, which attaches to the top channel of the frame 23 with 4 screws 34. Finally, a protective steel cover 21 screws into the top channel and act as a barrier, preventing the bolt head and any resultant shrapnel of the detonation from causing damage or injury.

Figure 4:
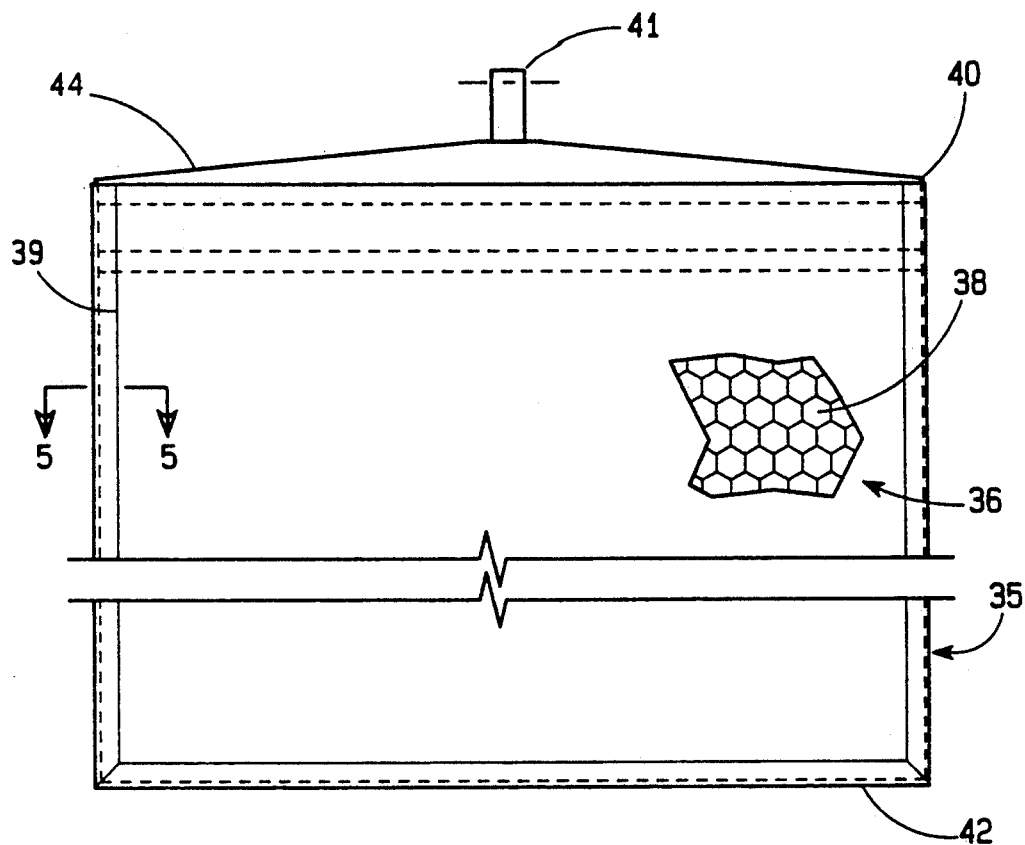
FIG. 4 shows details of the honeycomb door element as shown in FIG. 1
Figure 5:
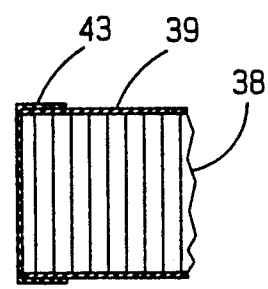
FIG. 5 shows a cross section of the honeycomb door as shown in FIG. 4 at section 75.

Referring to FIGS. 4 and 5, the door element 35 is composed of a 40×45×3.5 inch aluminum honeycomb sandwich panel 36, and an aluminum reinforcing gusset 40 bolted to the honeycomb panel 36 and pinned to the bottom piston rod assembly 41. The honeycomb panel 36 consists of a 3.25 inch thick 5052 aluminum honeycomb core 38 sandwiched between two ⅛ inch thick 6061 aluminum facings 39. The core 38 and facings 39 are bonded together using a high strength epoxy with a service temperature rating to 250 F. The panel 36 is reinforced with a 3.25×4.25×40 inch 6061 aluminum fitting 44 along the top width. In order to reduce the weight of this fitting a 2.25 inch hole is drilled through it with a centered axis along the 40 inch length of the fitting, which will not compromise the required strength of this reinforcement. The fitting is co-fabricated with the core and facings using the same bonding process. A ⅛ inch thick 7075 aluminum channel 42 is bonded to the bottom surface of the panel to protect it from impact damage during deceleration. The sides of the panel are protected by bonding 1/10 inch thick 6061 aluminum channels 43 along the lengths of the panel. Additionally these channels will be treated with a surface hardening process that also permanently increases the lubricity of the treated surface for minimum friction between the frame assembly, and to protect the sides of the door for possible impact damage. The reinforcing gusset 40 is fabricated from 6061 aluminum. This gusset 40 bolts into the honeycomb sandwich panel 36 via the top fitting 44 and is attached to the bottom piston rod assembly with a pinned connection 41. It reinforces the top of the door 36 by distributing the compressive force transmitted through the piston rod to the door during acceleration and deceleration.

Figure 6:
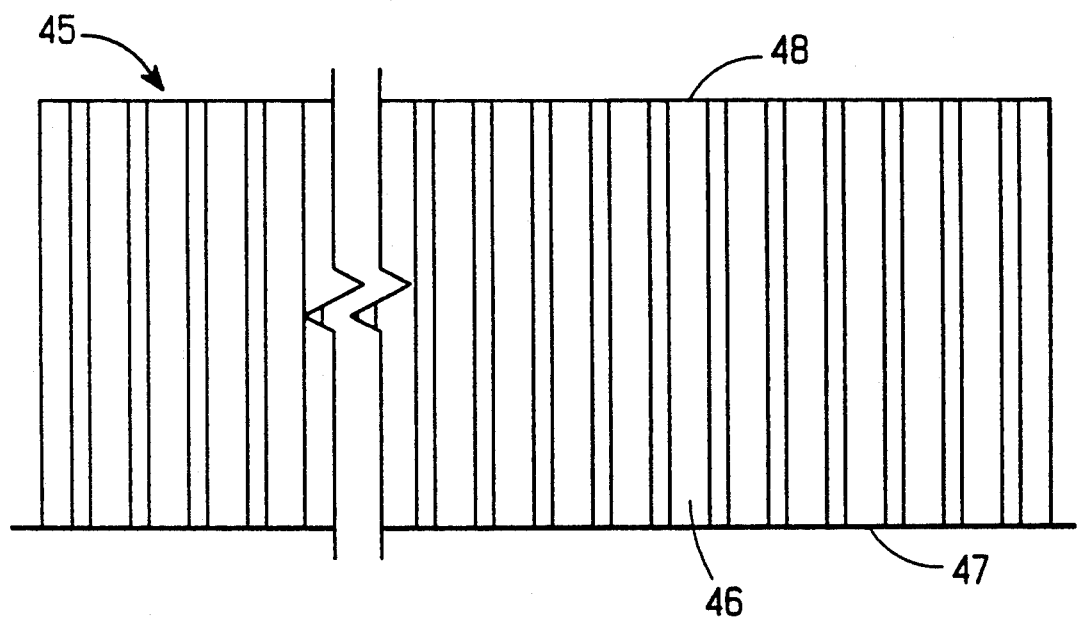
FIG. 6 shows details of the decelerator as shown in FIG. 1.

The moving parts of the high speed door are stopped by a 40×4.25×10 inch block of 5052 aluminum decelerating honeycomb. The bottom surface of the door impacts the honeycomb decelerator during closure. FIG. 6 shows a honeycomb decelerator 45 which inelastically crushes in such a way when the door closes, that the door will not sustain damage due to impact, bounce-back or inertial loads during deceleration. The core 46 is pre-crushed slightly to remove the compressive peak in the load versus deflection function upon initial impact. The decelerator 45 is an expendable item, and each high speed door closure requires one honeycomb decelerator 45. The honeycomb core 46 is bonded to a ⅛ inch thick aluminum base plate 47 which is included as an additional working surface to hold the honeycomb in position on the frame assembly. A 0.032 inch thick facing of aluminum 48 is bonded to the top surface of the honeycomb core 46 to protect it from damage that would otherwise result from objects impacting the honeycomb during pre-test, post-test, or storage of the core 46.

Figure 7:
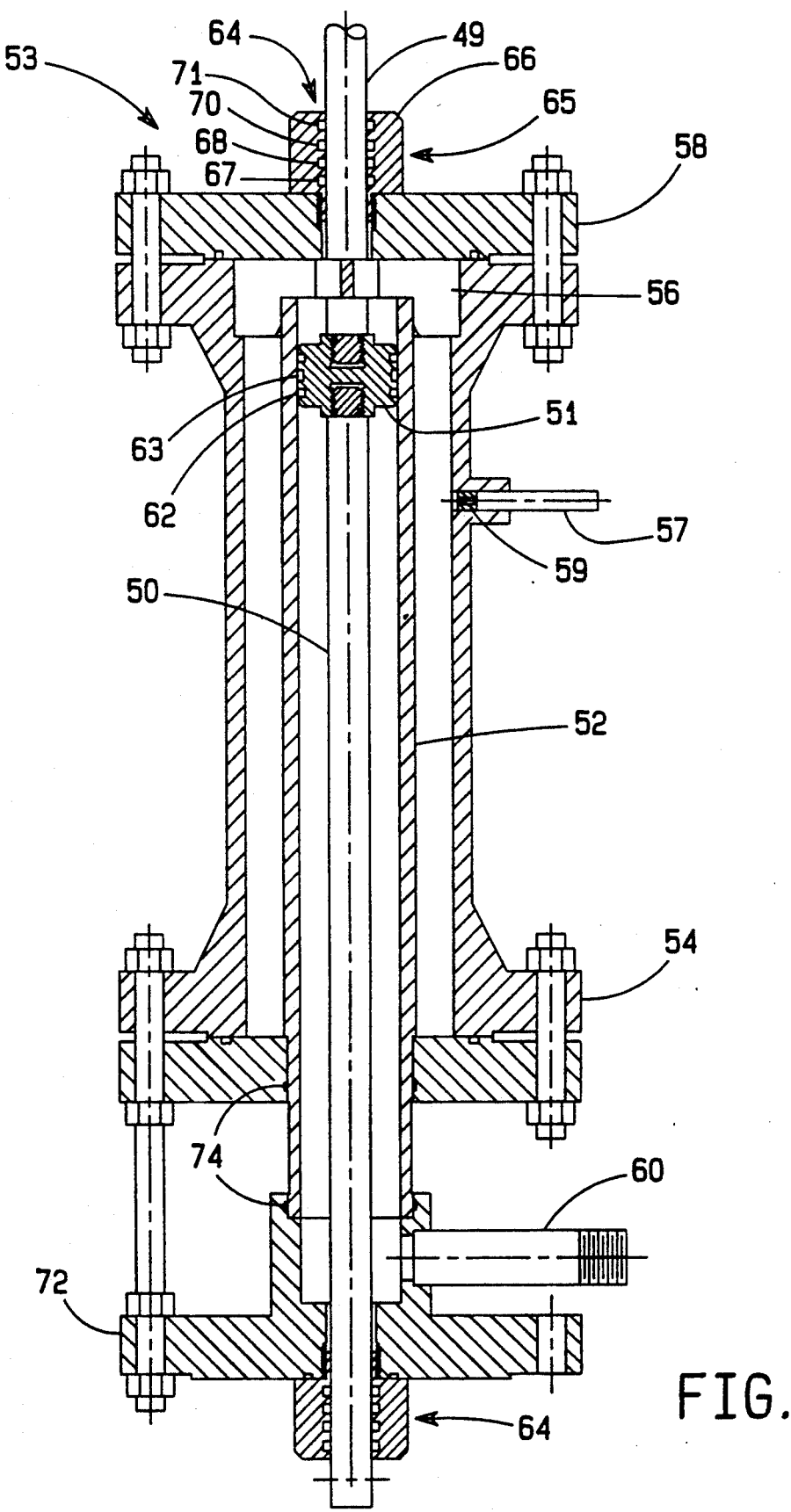
FIG. 7 shows details of the actuator and pressure supply cylinders as shown in FIG. 1.

Referring to FIG. 7, the piston rod comprises a top rod 49, a bottom rod 50, and a piston 51 which threadingly engages both rods. Both rods 49, 50 are fabricated from 7075-T6 aluminum tubing with additional machining to obtain the required dimensional tolerances and surface finishes. The piston 51 is fabricated from 7075-T6 aluminum round bar. The top rod 49 contains additional hardware to incorporate the explosive bolt. The top rod extends through the upper flange 58 of the actuator cylinder assembly 53 and has a sufficient length such that when the honeycomb door 35 is in the fully closed position the top rod 49 will still extend through the upper flange to maintain a seal against the high pressure nitrogen in the supply cylinder 53. The bottom rod 50 connects to the honeycomb door 35 via a removable connecting pin 55. The lower surface of the bottom rod assembly is flush with the top of the reinforcing gusset 40 of the honeycomb door 35 when the pin 55 is in place, it acts as the bearing surface for the inertial loads compressing the bottom rod 50 against the gusset 40. This leaves the role of the pin 55 with respect to strength to that of holding the dead weight of the honeycomb door 35 while in the raised and stationary position. Both rods 49, 50 are treated with a compound, which increases the hardness and lubricity of the exterior surfaces.

The piston 51 is guided through the full stroke along the inner diameter of the cylinder tube 52. The cylinder is fabricated from 1018-HF Carbon Steel tubing and machined to required dimensional tolerances and surface finish along the interior diameter. The interior diameter is prepared with a long wear-life, dry film lubricant. Additional machining along the outer diameter of the cylinder 52 is required for a proper fit between it and the lower flange 54 of the pressure supply cylinder 53 and also between it and the lower flange 54. The outer diameter of the cylinder 52 is treated with a corrosion resistant primer. The cylinder 52 is held in place by the lower flange 54 precision spacing between this cylinder 52 and the pressure supply cylinder 53 is also maintained with a spider 56 which sits on top of the cylinder 52 and inside the supply cylinder 53 top flange 55. The pressure supply cylinder 53 is fabricated from twelve inch seamless schedule 120 carbon steel pipe which also is treated with a corrosion resistant primer on the inside and outside. A ½ inch hard line 57 connects to an orifice 59 in the supply cylinder 53. The stainless steel line 60 ties into a nitrogen bottle serving as the working medium for the cylinder 52 actuation and threads into a fitting 61 at the end of the hard line for re-pressurization of the supply cylinder 53.

The seals 62 utilized in this assembly provide for both satisfactory pressure containment and minimal friction between the moving parts prior to and during closure of the high speed door. Centered between the two piston seals 62 is a wear ring 63 of a nylon and glass compound with a temperature range of −65 F to +250 F. The wear ring 63 provides a non-elastomeric bearing surface between the piston 51 and the steel cylinder 52, protecting those surfaces and the piston seals 62. The presence of the wear ring 63 reduces the sealing capacity of the seals by about 50 percent, which will leave the pressure capacity of this configuration above the pressure requirements of the assembly.

The piston rods 49, 50 are guided at one point along the top assembly and two points along the bottom assembly. All of the guide points are configured with an appropriate sealing system 64. The top rod assembly is guided via seals 65 incorporated within the top fitting 66 which threads into the upper flange 58 of the actuator cylinder 53. Situated closest to the high pressure side is a U-type seal 67 with a back-up seal 68 in the same groove. The groove 69 below the U-packing 67 holds a wear ring 70 similar to that described for the piston 51. The last groove contains a rod wiper 71 to clean the rod of moisture and grit prior to its entrance through the flange. The bottom rod assembly is guided with a configuration equivalent to the top rod guide. The main role of this bottom seal is as a guide and does not require the ability to contain high pressure gas. The bottom fitting 64 contains this sealing arrangement and threads into the lower flange 72.

A final seal arrangement is designed to maintain a contamination boundary between the environment inside the ventilation plenum 73 and ambient air external to it, which would otherwise be breached by the piston rod 50 crossing that boundary. It includes the same type of rod seal and wiper arrangement used in the bottom rod guide described in the previous paragraph. The lower flange 54 that serves as the bottom surface of the pressure supply cylinder also contains a lip-type seal 74. This static seal prevents leakage between the pressure supply cylinder 53 and the actuation cylinder 52 at the contact surface between the flange 54 and the cylinder 52.

In operation of the high speed door assembly, after a breach is determined an electrical signal detonates an explosive bolt. The door is closed by the actuation of the piston assembly and rapid acceleration occurs instantaneously by pre-pressurized nitrogen at 800 psi. Deceleration occurs with the use of an aluminum honeycomb energy absorber. The door element impacts the honeycomb at the end of its 3 foot stroke, and the honeycomb is then crushed four inches in length, which slows and stops the door in a predictable profile.

The foregoing description of the preferred embodiment of the invention has been presented for purposes of illustration and description. It is not intended to be exhaustive or to limit the invention to the precise form disclosed, and obviously many modifications and variations are possible in light of the above teaching.

The embodiments of the invention in which an exclusive property or privilege is claimed are defined as follows:

1. A high speed door assembly for fast closure of an opening comprising:
   a frame, said frame including two vertical channel members each having an upper and lower end, an upper horizontal channel member, and a lower horizontal channel member with one end of each of said upper and lower horizontal channel members connected to and traversing said vertical channel members at each of said upper and lower ends forming a continuing channel around the inner periphery of said high speed door, and said upper traversing horizontal channel member having an orifice located midway between said two vertical channel members;
   a pressure supply cylinder connected to said frame;
   an actuator cylinder encased in said pressure supply cylinder, said actuator cylinder having a piston encased therein including an upper and lower piston rod extending axially therefrom and said upper piston rod passing through said orifice of said upper traversing horizontal channel member;
   a honeycomb door element having a top and bottom surface area depose din said frame, said top surface area attached to said lower piston rod, and said honeycomb door element being held in a open position over said opening;
   means for deceleration affixed to said lower traversing horizontal channel member, wherein when said honeycomb door element is released said means for deceleration is positioned in such a way that the bottom surface of said honeycomb door element impacts said means for deceleration at a closed position thereby preventing movement of said honeycomb door element beyond a predetermined distance across said opening; and
   means for actuation connected to said upper piston rod and affixed to said upper traversing horizontal channel member.

2. A high speed door assembly as recited in claim 1 wherein said pressure supply cylinder further comprises:
   a spider connected to said pressure supply cylinder and positioned above said actuator cylinder, and said pressure supply cylinder having means for maintaining an internal pressure of at least 800 psi.

3. A high speed door assembly as recited in claim 2, wherein said frame further comprises:
   a horizontal traversing channel member attached to said vertical channel members at a point above said honeycomb door element when at said open position.

4. A high speed door assembly as recited in claim 3, wherein said means for deceleration comprises:
   a honeycomb element pre-crushed slightly to remove the compressive peak in the load versus deflection function upon initial impact of said honeycomb door element.

5. A high speed door assembly as recited in claim 4, wherein said means for actuation comprises:
   an explosive bolt deposed in and extending through said orifice and attached to said upper piston rod, wherein when explosive bolt is activated said upper piston rod releases causing said honeycomb door to release to said closed position.

6. A high speed door assembly as recited in claim 5, wherein said honeycomb door element comprises:
   a honeycomb core, a front facing, a rear facing, and reinforcing channel members bonded along the sides of said honeycomb door element.

7. A high speed door assembly as recited in claim 6, wherein said honeycomb door element comprises:
   a gusset assembly attached to the top surface area of said honeycomb door element.

8. A high speed door assembly as recited in claim 7, wherein said means for deceleration comprises:
   a facing plate bonded to said honeycomb core, and a base plate bonded to said honey comb core and affixed to said frame.

9. A device for quick closure and containment of an opening comprising:
   a frame and said frame is positioned across said opening;
   a pressure supply cylinder connected to said frame;

an actuation cylinder encased in said pressure supply cylinder;

a honeycomb door slidably deposed in said frame;

means for deceleration connected to said frame; and means for actuation connected to said frame, whereby when said means for activation is engaged said honeycomb door is thrust across said opening providing a quick closure.

10. A device for quick closure and containment as recited in claim 9 wherein:

said frame includes two vertical channel members each having an upper and lower end, an upper horizontal channel member and a lower horizontal channel member, with one end of each of said upper and lower horizontal channel members connected to and traversing said vertical channel members at each of said upper and lower ends forming a continuing channel around the inner periphery of said device for quick closure and containment, and said upper traversing horizontal channel member having an orifice located midway between said two vertical channel members.

11. A device for quick closure and containment as recited in claim 10 wherein:

said actuator cylinder encased in said pressure supply cylinder, further comprises, a piston encased therein including an upper and lower piston rod extending axially therefrom and said upper piston rod passing through said orifice of said upper traversing horizontal channel member.

12. A device for quick closure and containment as recited in claim 11 wherein:

said honeycomb door element having a top and bottom surface area deposed in said frame, said top surface area attached to said lower piston rod, and said honeycomb door element being held in a open position over said opening.

13. A device for quick closure and containment as recited in claim 12 wherein:

said means for deceleration affixed to said lower traversing horizontal channel member, wherein when said honeycomb door element is released said means for deceleration is positioned in such a way that the bottom surface of said honeycomb door element impacts said means for deceleration at a closed position thereby preventing movement of said honeycomb door element beyond a predetermined distance across said opening.

14. A device for quick closure and containment as recited in claim 13 wherein:

said means for actuation connected to said upper piston rod and affixed to said upper traversing horizontal channel member.

15. A device for quick closure and containment as recited in claim 14, wherein said pressure supply cylinder further comprises:

a spider connected to said pressure supply cylinder and positioned above said actuator cylinder, and said pressure supply cylinder having means for maintaining an internal pressure of at least 800 psi.

16. A device for quick closure and containment as recited in claim 15, wherein said frame further comprises:

a horizontal traversing channel member attached to said vertical channel members at a point above said honeycomb door element when at said open position.

17. A device for quick closure and containment as recited in claim 16, wherein said means for deceleration comprises:

a honeycomb element pre-crushed slightly to remove the compressive peak in the load versus deflection function upon initial impact of said honeycomb door element.

18. A device for quick closure and containment as recited in claim 17, wherein said means for actuation comprises:

an explosive bolt deposed in and extending through said orifice and attached to said upper piston rod, wherein when explosive bolt is activated said upper piston rod releases causing said honeycomb door to release to said closed position.

19. A device for quick closure and containment as recited in claim 18, wherein said honeycomb door element comprises:

a honeycomb core, a front facing, a rear facing, and reinforcing channel members bonded along the sides of said honeycomb door element; and a gusset assembly attached to the top surface area of said honeycomb door element.

20. A device for quick closure and containment a recited in claim 19, wherein said means for deceleration comprises:

a facing plate bonded to said honeycomb core, and a base plate bonded to said honey comb core and affixed to said frame.

* * * * *